US008295461B1

(12) United States Patent
Croak et al.

(10) Patent No.: US 8,295,461 B1
(45) Date of Patent: Oct. 23, 2012

(54) METHOD AND APPARATUS FOR RE-ORIGINATING CALLS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 134 days.

(21) Appl. No.: 11/263,096

(22) Filed: Oct. 31, 2005

(51) Int. Cl.
*H04M 3/42* (2006.01)

(52) U.S. Cl. ........... 379/201.02; 379/88.19; 379/201.01; 379/210.01; 379/211.01; 379/211.02; 370/351; 370/352

(58) Field of Classification Search ............. 370/211.02, 370/351, 352; 379/114, 219, 221.01, 88.19, 379/201.01, 201.02, 210.01
See application file for complete search history.

(56) References Cited

U.S. PATENT DOCUMENTS

| | | | | |
|---|---|---|---|---|
| 5,991,377 A * | 11/1999 | Malik | ...................... | 379/114.05 |
| 6,035,031 A * | 3/2000 | Silverman | ................ | 379/209.01 |
| 6,272,215 B1 * | 8/2001 | Cockrell et al. | ............... | 379/219 |
| 2002/0080751 A1 * | 6/2002 | Hartmaier | ...................... | 370/338 |
| 2003/0202642 A1 * | 10/2003 | Wheeler et al. | ............. | 379/88.18 |
| 2004/0030604 A1 * | 2/2004 | Young | .............................. | 705/26 |
| 2004/0174965 A1 * | 9/2004 | Brahm et al. | ............... | 379/88.19 |
| 2004/0180654 A1 * | 9/2004 | Chen | ............................. | 455/433 |
| 2004/0259543 A1 * | 12/2004 | Lee et al. | ....................... | 455/433 |
| 2005/0111632 A1 * | 5/2005 | Caputo et al. | .............. | 379/88.16 |
| 2005/0163301 A1 * | 7/2005 | Didcock | .................. | 379/211.01 |
| 2005/0180457 A1 * | 8/2005 | Chen et al. | .................... | 370/466 |
| 2005/0195802 A1 * | 9/2005 | Klein et al. | .................... | 370/352 |
| 2005/0220286 A1 * | 10/2005 | Valdez et al. | ............ | 379/211.02 |
| 2007/0147343 A1 * | 6/2007 | Sasaki et al. | .................. | 370/352 |

* cited by examiner

Primary Examiner — Khai N Nguyen

(57) ABSTRACT

A method and apparatus for enabling a subscriber who is originating a call to a called party endpoint to specify call handling treatments when a busy or a no answer network condition is encountered when calling the called party endpoint with no subscribed network based voice mail service are disclosed. The subscriber, for example, can re-originate the call that is originally directed to a home phone number of the called party to a cellular phone number of the called party instead upon encountering a busy or no answer network condition.

19 Claims, 4 Drawing Sheets

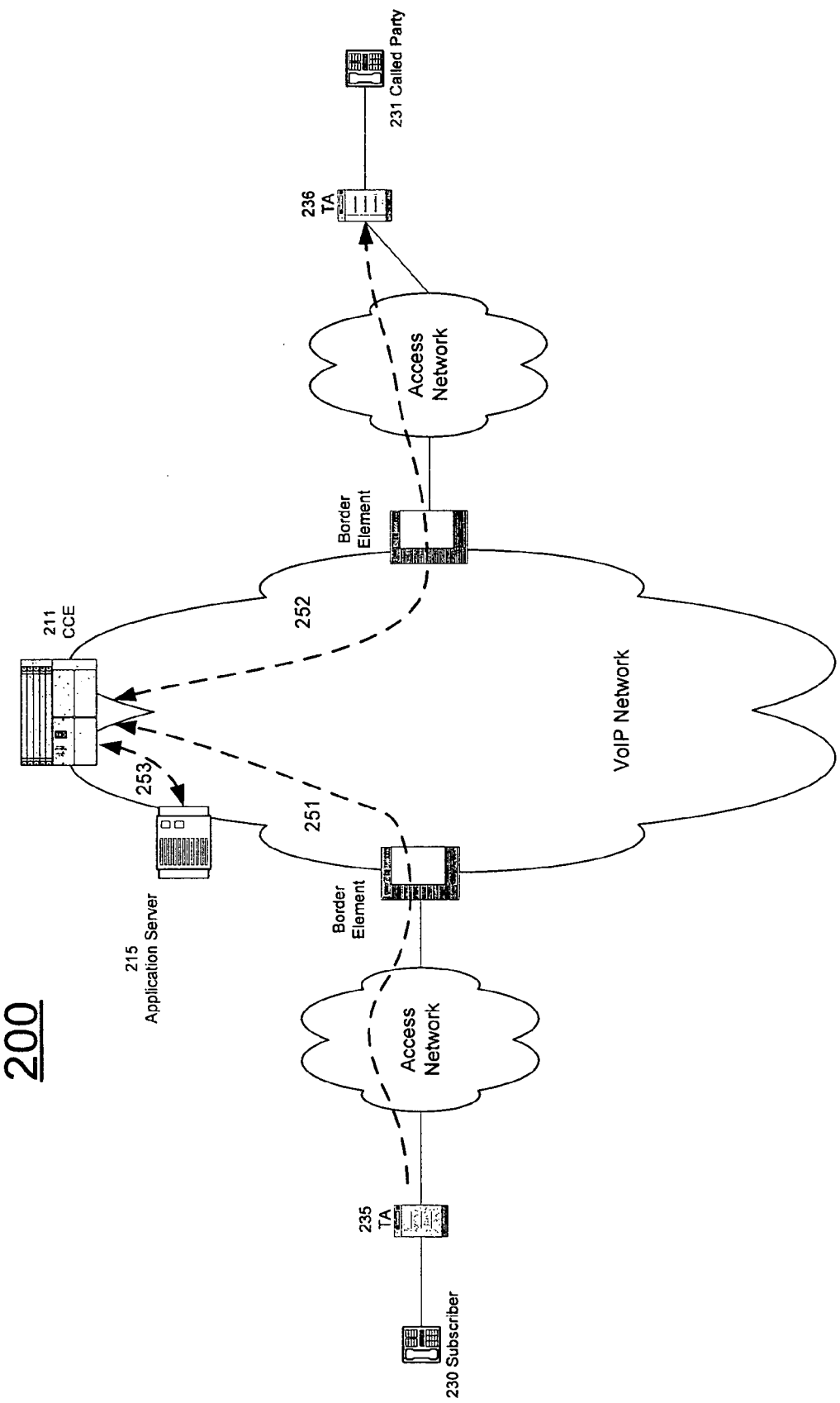

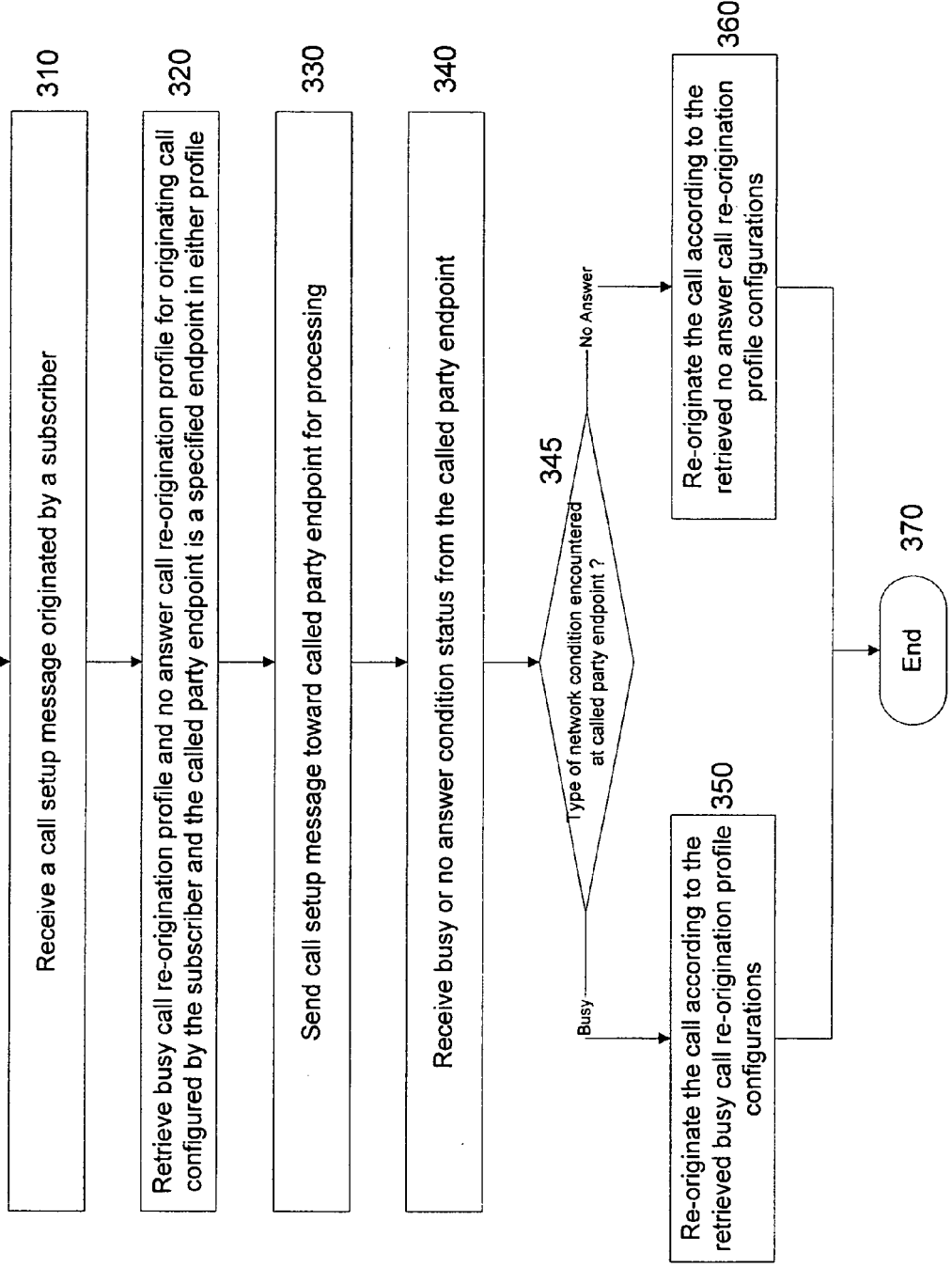

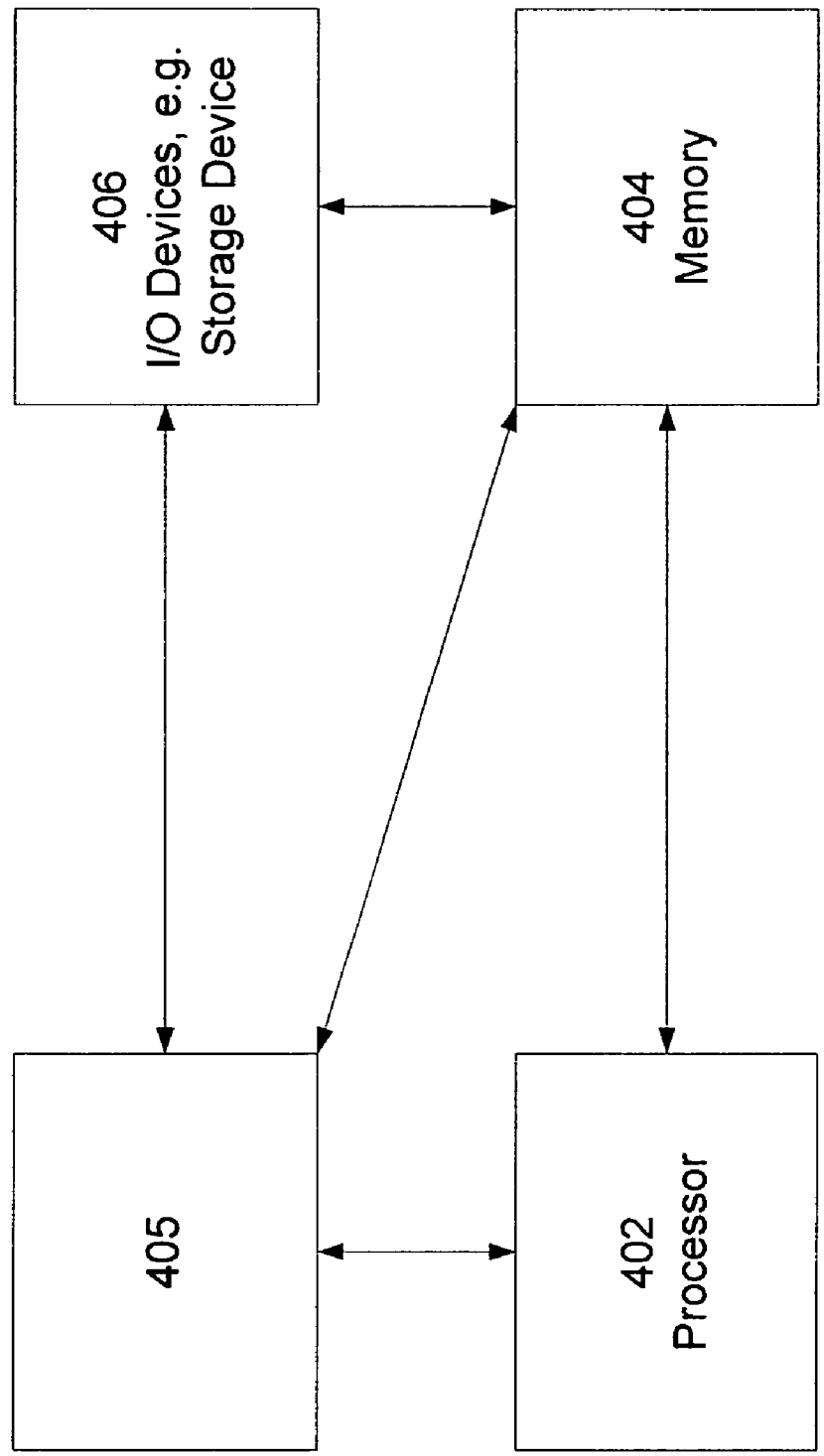

METHOD AND APPARATUS FOR RE-ORIGINATING CALLS

The present invention relates generally to communication networks and, more particularly, to a method and apparatus for re-originating calls under certain network conditions in communication networks, e.g., packet networks such as Voice over Internet Protocol (VoIP) networks.

BACKGROUND OF THE INVENTION

A subscriber of VoIP network services can encounter busy and no answer network conditions when the subscriber places a call to a called party phone number. Unless there is a voice mail service available at the called party endpoint, the subscriber must either continuously call the called party endpoint until the called party is available or re-originate the call to another endpoint that can satisfy the subscriber's calling needs.

Therefore, a need exists for a method and apparatus for re-originating calls under certain network conditions in a packet network, e.g., a VoIP network.

SUMMARY OF THE INVENTION

In one embodiment, the present invention enables a subscriber who is originating a call to a called party endpoint to specify call handling treatments when a busy or a no answer network condition is encountered when calling the called party endpoint with no subscribed network based voice mail service. The subscriber, for example, can re-originate the call that is originally directed to a home phone number of the called party to a cellular phone number of the called party instead upon encountering a busy or no answer network condition.

BRIEF DESCRIPTION OF THE DRAWINGS

The teaching of the present invention can be readily understood by considering the following detailed description in conjunction with the accompanying drawings, in which:

FIG. 2 illustrates an example of re-originating calls under certain network conditions in a VoIP network of the present invention;

FIG. 3 illustrates a flowchart of a method for re-originating calls under certain network conditions in a packet network, e.g., a VoIP network, of the present invention; and FIG. 4 illustrates a high level block diagram of a general purpose computer suitable for use in performing the functions described herein.

To facilitate understanding, identical reference numerals have been used, where possible, to designate identical elements that are common to the figures.

DETAILED DESCRIPTION

Figure 1:
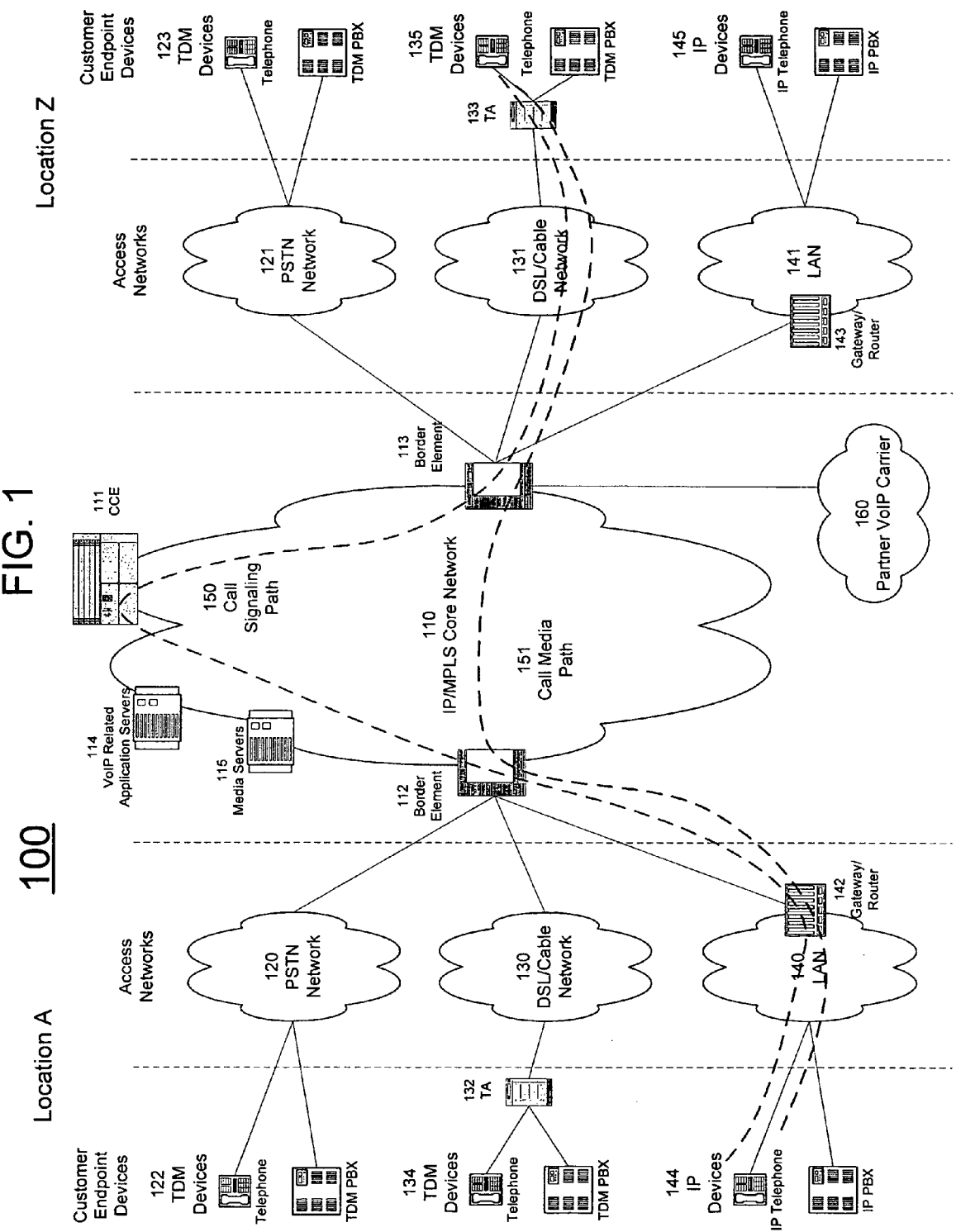
FIG. 1 illustrates an exemplary Voice over Internet Protocol (VoIP) network related to the present invention.

To better understand the present invention, FIG. 1 illustrates a communication architecture 100 having an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a SIP back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, teleconference bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

A subscriber of VoIP network services can encounter busy and no answer network conditions when the subscriber places a call to a called party phone number. Unless there is a voice mail service available at the called party endpoint, the subscriber must either continuously call the called party endpoint until the called party is available or re-originate the call to another endpoint that can satisfy the subscriber's calling needs.

To address this need, the present invention enables a subscriber who is originating a call to a called party endpoint to specify call handling treatments when a busy or a no answer network condition is encountered when calling the called party endpoint with no subscribed network based voice mail service. The subscriber, for example, can re-originate the call that is originally directed to a home phone number of the called party to a cellular phone number of the called party instead, upon encountering a busy or no answer network condition.

FIG. 2 illustrates an example 200 of re-originating calls under certain network conditions in a packet network, e.g., a VoIP network of the present invention. In FIG. 2, subscriber 230 subscribes to the re-originating calls under certain network conditions service feature. The subscriber makes a call to called party 231 who has not subscribed to a network based voice mail service. A call setup message is sent by TA 235 to CCE 211 using flow 251. Upon receiving the call setup message, CCE 211 determines from AS 215 using flow 253 that the calling party, subscriber 230, has subscribed to the re-originating calls under certain network conditions service feature and forwards the call to called party 231 via TA 236 using flow 252 for call setup completion. CCE 211 also retrieves the busy call re-origination profile and the no answer call re-origination profile from AS 215. Called party 231 is a called party specified in the busy call re-origination profile and the no answer call re-origination profile to receive individualized call re-origination treatment under specified network conditions.

In one instance, called party 231 is unavailable to answer the call. CCE 211 detects a no answer condition and uses the retrieved no answer call re-origination profile to determine how to handle the no answer condition for a call destined to subscriber 231. In the no answer call re-origination profile configured by subscriber 230, CCE 211 determines that a no answer condition to called party 231 should be forwarded to another phone number, say a cellular phone number, that belongs to called party 231; therefore, CCE 211 forwards the call to the configured forwarding number specified by subscriber 230.

In another instance, called party 231 is busy on the line engaging in another phone call. CCE 211 detects a busy condition and uses the retrieved busy call re-origination profile to determine how to handle the busy condition for a call destined to subscriber 231. In the busy call re-origination profile configured by subscriber 230, CCE 211 finds out that a busy condition to called party 231 should be forwarded to another phone number, say an office phone number, that belongs to called party 231; therefore, CCE 211 forwards the call to the voice mailbox of called party 231 as specified by subscriber 230.

FIG. 3 illustrates a flowchart of a method 300 for re-originating calls under certain network conditions in a packet network, e.g., a VoIP network, of the present invention. Method 300 starts in step 305 and proceeds to step 310.

In step 310, the method receives a call setup message originated from a subscriber who subscribes to the re-originating calls under certain network conditions service feature. The call setup message is received by a CCE.

In step 320, the method retrieves the busy call re-origination profile (e.g., a busy profile) and the no answer call re-origination profile (e.g., a no answer profile) configured by the subscriber that will be used to handle the call under busy or no answer conditions at the specified called party endpoint if the called party has not subscribed to a network based voice mail service. The CCE also determines that the called party is a called endpoint specified in the busy call re-origination profile or the no answer call re-origination profile. The busy call re-origination profile and the no answer call re-origination profile specify how a call destined to a called party endpoint should be handled if the called party endpoint experiences a busy or a no answer condition respectively. The busy call re-origination profile and the no answer call re-origination profile are retrieved by the CCE from an AS.

In one embodiment, the re-origination is only performed if the called party does not have a voice mail service. If the called party does have a voice mail service, then the calling party is allowed to leave a voice mail and no re-origination is performed.

In step 330, the method sends the call setup message to the called party endpoint for processing. The call setup message to the called party endpoint is sent by the CCE.

In step 340, the method receives a busy or a no answer condition from the called party endpoint. The busy or the no answer condition from the called party endpoint is received by the CCE.

In step 345, the method checks the type of conditions returned by the called party endpoint during call setup. If the type of conditions returned by the called party endpoint during call setup is a busy condition, the method proceeds to step 350. If the type of conditions returned by the called party endpoint during call setup is a no answer condition, the method proceeds to step 360.

In step 350, the method processes the call according to the retrieved busy call re-origination profile configured by the subscriber when calling the specified called party endpoint. The call is processed by the CCE according to the retrieved busy call re-origination profile for the specified called party endpoint. In one embodiment, the busy call re-origination profile specifies the call be forwarded to another phone number configured by subscriber 230 under the called endpoint busy condition.

In step 360, the method processes the call according to the retrieved no answer call re-origination profile configured by the subscriber when calling the specified called party endpoint. The call is processed by the CCE according to the retrieved no answer call re-origination profile for the specified called party endpoint. In one embodiment, the no answer call re-origination profile specifies the call be forwarded to another phone number configured by subscriber 230 under the called endpoint no answer condition. The method ends in step 370.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for re-originating calls under certain network conditions, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for re-originating calls under certain network conditions can be loaded into memory 404 and executed by processor 402 to implement the functions as discussed above. As such, the present process 405 for re-originating calls under certain network conditions (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for re-originating a call in a communication network, comprising:
   receiving a call setup message from a subscriber destined to a called endpoint of a called party, wherein the subscriber is a calling party and is subscribed to a re-originating calls service that is provided by the communication network;
   detecting the called endpoint as not having a network based voice mail service subscription;
   determining the called endpoint is specified in a call re-origination profile, wherein the call re-origination profile is configured by the subscriber; and
   in response to detecting the called endpoint as not having the network based voice mail service subscription and determining the called endpoint is specified in the call re-origination profile, re-originating the call setup message if a particular condition is returned by the called endpoint, wherein the call setup message is re-originated to the called party in accordance with the call re-origination profile for the particular condition for the called endpoint, wherein the re-originating comprises forwarding the call setup message to an alternative endpoint phone number as configured in the call re-origination profile.

2. The method of claim 1, wherein the communication network is an internet protocol network.

3. The method of claim 1, wherein the call setup message is received by a call control element.

4. The method of claim 3, wherein the call re-origination profile is retrieved by the call control element from an application server.

5. The method of claim 1, wherein the particular condition comprises a busy condition that is returned by the called endpoint.

6. The method of claim 1, wherein the particular condition comprises a no answer condition that is returned by the called endpoint.

7. The method of claim 1, wherein the call setup message is re-originated by a call control element.

8. A non-transitory computer-readable medium having stored thereon a plurality of instructions, the plurality of instructions including instructions which, when executed by a processor, cause the processor to perform a method for re-originating a call in a communication network, comprising:
   receiving a call setup message from a subscriber destined to a called endpoint of a called party, wherein the subscriber is a calling party and is subscribed to a re-originating calls service that is provided by the communication network;
   detecting the called endpoint as not having a network based voice mail service subscription;
   determining the called endpoint is specified in a call re-origination profile, wherein the call re-origination profile is configured by the subscriber; and
   in response to detecting the called endpoint as not having the network based voice mail service subscription and determining the called endpoint is specified in the call re-origination profile, re-originating the call setup message if a particular condition is returned by the called endpoint, wherein the call setup message is re-originated to the called party in accordance with the call re-origination profile for the particular condition for the called endpoint, wherein the re-originating comprises forwarding the call setup message to an alternative endpoint phone number as configured in the call re-origination profile.

9. The non-transitory computer-readable medium of claim 8, wherein the communication network is an internet protocol network.

10. The non-transitory computer-readable medium of claim 8, wherein the call setup message is received by a call control element.

11. The non-transitory computer-readable medium of claim 10, wherein the call re-origination profile is retrieved by the call control element from an application server.

12. The non-transitory computer-readable medium of claim 8, wherein the particular condition comprises a busy condition that is returned by the called endpoint.

13. The non-transitory computer-readable medium of claim 8, wherein the particular condition comprises a no answer condition that is returned by the called endpoint.

14. The non-transitory computer-readable medium of claim 8, wherein the call setup message is re-originated by a call control element.

15. An apparatus for re-originating a call in a communication network, comprising:
   a processor; and
   a non-transitory computer-readable medium in communication with the processor, the non-transitory computer-readable medium having stored thereon a plurality of instructions, the plurality of instructions including instructions which, when executed by the processor, cause the processor to perform a method comprising:
      receiving a call setup message from a subscriber destined to a called endpoint of a called party, wherein the subscriber is a calling party and is subscribed to a re-originating calls service that is provided by the communication network;
      detecting the called endpoint as not having a network based voice mail service subscription;
      determining the called endpoint is specified in a call re-origination profile, wherein the call re-origination profile is configured by the subscriber; and
      in response to detecting the called endpoint as not having the network based voice mail service subscription and determining the called endpoint is specified in the call re-origination profile, re-originating the call setup message if a particular condition is returned by the called endpoint, wherein the processor is further configured to re-originate the call setup message to the called party in accordance with the call re-origination profile for the particular condition for the called endpoint, wherein the re-originating comprises forwarding the call setup message to an alternative endpoint phone number as configured in the call re-origination profile.

16. The apparatus of claim 15, wherein the communication network is an Internet protocol network.

17. The apparatus of claim 15, wherein the method further comprises retrieving the origination profile from an application server.

18. The apparatus of claim 15, wherein the particular condition comprises a busy condition that is returned by the called endpoint.

19. The apparatus of claim 15, wherein the particular condition comprises a no answer condition that is returned by the called endpoint.

* * * * *